April 24, 1928.  E. A. CHASE  1,667,309
METHOD OF ORNAMENTING STONE
Filed April 4, 1927
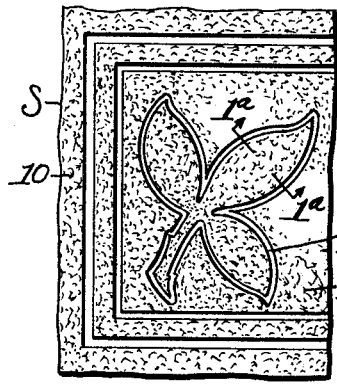

Patented Apr. 24, 1928.

1,667,309

UNITED STATES PATENT OFFICE.

ELROY A. CHASE, OF NORTHFIELD, VERMONT.

METHOD OF ORNAMENTING STONE.

Application filed April 4, 1927. Serial No. 180,799.

This invention relates to the provision of ornamentation on the surface of a granite block used as a memorial, and on other similar surfaces.

It is the general object of my invention to reduce the expense of such ornamentation by introducing an improved method of operation, by which the ornamental effect of the work is increased, while a relatively low production cost is maintained. More specifically, my invention contemplates a process in which hand tool work and sand blast work are so associated and combined that improved results and economical procedure are both substantially attained.

My invention further relates to improved methods, and associations of method steps, which will be hereinafter described and more particularly set forth in the appended claims.

A preferred form of the invention is illustrated in the drawings, in which

Fig. 1 is a plan view of a portion of the granite surface to which the first steps of my improved method have been applied;

Fig. 1ª is a detail sectional view, taken along the line 1ª—1ª in Fig. 1;

Fig. 2 is a partial plan view, illustrating the next step of my improved process;

Fig. 2ª is a sectional view, taken along the line 2ª—2ª in Fig. 2;

Figs. 3, 4 and 5 are similar partial plan views, illustrating successive steps in my improved method;

Figs. 3ª, 4ª and 5ª are detailed sectional views, taken along the lines 3ª—3ª, 4ª—4ª and 5ª—5ª, in Figs. 3, 4 and 5 respectively;

Figs. 6 and 7 are detailed sectional views, illustrating further steps of my improved method, and Fig. 8 is a plan view showing the appearance of the completed work.

Referring to the drawings, I have shown a portion of a block S, to which a layer 10 of any suitable sand-resisting compound has been applied, such compound being commonly formed of glue.

The desired ornamental figure is then cut or stencilled in the compound 10 by removing the stencilled portions 11, as shown in Fig. 1ª. A sand blast is then somewhat lightly applied to the surface of the block S cutting the stencilled lines slightly below the surface of the block, as indicated at 12 in Figs. 2 and 2ª.

The glue or covering compound 10 is then removed from the portion 13, enclosed within the stencilled outline 11, as indicated in Figs. 3 and 3ª. The background of the design remains covered with the compound 10. The operator then applies a hand tool to the exposed surface 13 of the design, cutting the outline to any desired contour, as indicated in Figs. 4 and 4ª. This hand tool operation is very much facilitated by the previous cutting of the outline 12, as shown, indicating the edges of the desired figure. It is desirable that the outline 12 be cut to a slight depth only, as otherwise the hand tool operation may break off the edges of the figures along the outline 12.

After the hand tool operation, the surface of the figure is re-coated with the covering compound, as indicated at 14 as shown in Fig. 5. The outline of the figure is then restencilled, including the veins of the leaf as indicated at 15 or other similar details. The sand blast is then applied to cut the stencilled outlines, as indicated at 16 and 17 in Fig. 5.

The compound 10 is then removed from the background portion of the surface, as indicated at 17 in Fig. 6, and the background is then cut down by the sand blast, as indicated at 20 in Fig. 7.

If a plain background is desired, this operation of Fig. 7 is continued to cut the background to a greater depth. If, however, a variegated background is preferred, I insert a screen of suitable design in front of the stone, after the work has reached the stage illustrated in Fig. 7. The sand blast is then again applied, cutting the background to greater depth and giving it a variegated effect as shown in dotted lines in Fig. 7, and also as illustrated in Fig. 8.

The portions of glue 14 are then removed from the face of the design and the finished work appears as shown in the upper right-hand portion of Fig. 8.

Having thus described the various steps of my improved process, it will be seen that I have achieved a greatly improved result in which the figure has a contoured surface instead of a flat surface, and in which the background may be either plain or variegated as desired. Furthermore, I have achieved this result at a great saving of time and labor over the old method of producing such work entirely by hand labor.

With my improved method, the work is performed entirely by the use of a sand blast, with the exception of the hand tool work operation indicated in Figs. 4 and 4ª, and this one hand operation has been very greatly simplified and expedited by providing the outline edge-cuts 12, as indicated in Figs. 3 and 3ª.

Having thus described my invention and the advantages thereof, I do not wish to be limited to the details herein disclosed, otherwise than as set forth in the claims, but

What I claim is:—

1. A method of ornamenting a surface of granite or other similar material, which consists in coating the surface to be ornamented with a layer of sand-resisting compound, stencilling the outline of a desired figure therein, sand-blasting the stencilled outline in the stone to a relatively slight depth, removing the compound from the figure within the sand-blasted outline shaping the exposed surface of the figure to a desired contour, re-surfacing the contoured figure with compound, removing the compound from the background of the design, and sand-blasting the background to a desired depth.

2. A method of ornamenting a surface of granite or other similar material, which consists in coating the surface to be ornamented with a layer of sand-resisting compound, stencilling the outline of a desired figure therein, sand-blasting the stencilled outline in the stone to a relatively slight depth, removing the compound from the figure within the sand-blasted outline, shaping the exposed surface of the figure to a desired contour, re-surfacing the contoured figure with compound, re-stencilling the figure, removing the compound from the background of the design, and sand-blasting the background to a desired depth.

3. A method of ornamenting a surface of granite or other similar material, which consists in coating the surface to be ornamented with a layer of sand-resisting compound, stencilling the outline of a desired figure therein, sand-blasting the stencilled outline in the stone to a relatively slight depth, removing the compound from the figure within the sand-blasted outline, shaping the exposed surface of the figure to a desired contour, re-surfacing the contoured figure with compound, re-stencilling the figure, sand-blasting the stencilled lines to a substantial depth, removing the compound from the background of the design, sand-blasting the background to a desired depth, inserting a perforated screen in the path of the sand-blast, and completing the sand-blasting through said screen.

4. A method of ornamenting a surface of granite or other similar material, which consists in coating the surface to be ornamented with a layer of sand-resisting compound, stencilling the outline, of a desired figure therein, sand-blasting the stencilled outline in the stone to a relatively slight depth, removing the compound from the figure within the sand-blasted outline, applying a hand tool to shape the exposed and outlined surface of the figure to a desired contour, re-surfacing the contoured figure with compound, removing the compound from the background of the design, and sand-blasting the background to a desired depth.

In testimony whereof I have hereunto affixed my signature.

ELROY A. CHASE.